United States Patent [19]

Ogawa et al.

[11] 4,257,468

[45] Mar. 24, 1981

[54] PNEUMATIC TIRE HAVING AN IMPROVED CHIPPING RESISTANT PROPERTY EMPLOYING SYNDIOTACTIC-1,2-POLYBUTADIENE IN TREAD RUBBER

[75] Inventors: Masaki Ogawa, Sayama; Tamio Araki, Musashino; Shinji Yamamoto, Ichihara, all of Japan

[73] Assignees: Bridgestone Tire Company Limited, Tokyo; Ube Industries Limited, Ube, both of Japan

[21] Appl. No.: 27,413

[22] Filed: Apr. 5, 1979

[30] Foreign Application Priority Data

Apr. 6, 1978 [JP] Japan .................................. 53-39678

[51] Int. Cl.[3] ....................... B60C 11/00; B60C 1/00; C08L 7/00
[52] U.S. Cl. ........................... 152/209 R; 152/330 R; 152/357 R; 152/374; 152/DIG. 4; 260/5; 260/42.32; 260/42.47; 260/762; 525/236
[58] Field of Search ........... 152/209 R, 330 R, 357 R, 152/374, DIG. 4; 260/5, 42.32, 42.47, 762; 525/236, 241

[56] References Cited

U.S. PATENT DOCUMENTS

| 3,625,271 | 12/1971 | Hutch .................................. 152/354 |
| 3,827,991 | 8/1974 | Ando et al. .............................. 260/5 |
| 4,154,277 | 5/1979 | Sato et al. ......................... 152/209 R |
| 4,196,106 | 4/1980 | Matsuura et al. ......................... 260/5 |
| 4,202,850 | 5/1980 | Yamamoto et al. .................. 260/5 X |

*Primary Examiner*—John T. Goolkasian
*Assistant Examiner*—Lois E. Rodgers
*Attorney, Agent, or Firm*—Sughrue, Rothwell, Mion, Zinn and Macpeak

[57] ABSTRACT

A pneumatic tire having an improved chipping resistant property is disclosed. In the tire, the tread portion is formed with a vulcanizate of a rubber composition comprising 3–40 parts by weight of short fibers of syndiotactic-1,2-polybutadiene, 30–100 parts by weight of carbon black and 0.2–5 parts by weight of a p-phenylenediamine type antioxidant, on a basis of 100 parts by weight of a rubber selected from natural rubber, synthetic rubber and a blend thereof in an optional blending ratio.

5 Claims, No Drawings

PNEUMATIC TIRE HAVING AN IMPROVED CHIPPING RESISTANT PROPERTY EMPLOYING SYNDIOTACTIC-1,2-POLYBUTADIENE IN TREAD RUBBER

BACKGROUND OF THE INVENTION (1) Field of the Invention

The present invention relates to a pneumatic tire having an improved chipping resistant property. A vulcanizate of a novel rubber composition comprising short fibers of syndiotactic (hereinafter abbreviated as syn)-1,2-polybutadiene is disposed in a tread portion of the tire.

(2) Description of the Prior Art

Generally, the tread portion of the tire is required to have a high wear resistance as a fundamental performance criteria. To this end, there have hitherto been proposed a method wherein carbon black having a high structure and a small particle size is compounded into a rubber composition for tread, a method wherein cis-1,4-polybutadiene rubber is used in the tread portion, and the like in order to improve the wear resistance of the tread portion. However, such use of carbon black or polybutadiene rubber has an undesirable tendency to promote a chipping phenomenon in the tread portion, resulting in not only serious deterioraton of tire appearance but also lowering of tire life. Particularly, such a chipping phenomenon appears remarkably on rough roads. Until now, a satisfactory means for preventing the occurrence of the chipping phenomenon has not been realized.

Moreover, attempts have been made to solve the above mentioned drawback by incorporating short fibers into the tread portion, but they have not yet been put to practical use. Because the short fiber reinforced rubber compositions as proposed in the prior art have drawbacks for example the adhesion of short fibers to rubber after the vulcanization is insufficient and hence a large creep is caused, and the life at fracture of rubber becomes considerably short when subjected to repeated extension.

SUMMARY OF THE INVENTION

The inventors have made various studies with respect to a means for solving the aforementioned drawbacks and found that the tear strength of rubber can largely be improved by compounding short fibers of syn-1,2-polybutadiene into rubber. Further, it has been found on a basis of the above knowledge that groove cracking, which is apt to frequently occur in tires having a rib type tread pattern, can be prevented by adding a p-phenylenediamine type antioxidant to the rubber composition comprising syn-1,2-polybutadiene short fibers, whereby there are obtained pneumatic tires having improved wear resistance, resistance to groove cracking and particularly an improved chipping resistant property. As a result the present invention has been accomplished.

According to the present invention there is provided a pneumatic tire having an improved chipping resistant property, characterized by forming a tread portion of the tire with a vulcanizate of a rubber composition comprising 3–40 parts by weight of short fibers of syndiotactic-1,2-polybutadiene having a maximum diameter of not more than $10\mu$ and an average diameter of less than $1\mu$, 30–100 parts by weight of carbon black having an iodine adsorption value of not less than 76 mg/g and 0.2–5 parts by weight of a p-phenylenediamine type antioxidant, on a basis of 100 parts by weight of a rubber selected from natural rubbers, synthetic rubbers and blends thereof in an optional blending ratio.

DETAILED DESCRIPTION OF THE INVENTION

For the rubber contained in the rubber composition according to the present invention, use may be made of natural rubbers, synthetic rubbers and blends thereof in an optional blending ratio. For the synthetic rubber, there are preferably used diene type synthetic rubbers such as polybutadiene rubber, styrene-butadiene copolymer rubber, ethylene-propylene-diene terpolymer rubber, polyisoprene rubber, butyl rubber and the like.

According to the present invention, short fibers of syn-1,2-polybutadiene to be compounded with the rubber have a maximum diameter of not more than $10\mu$ and an average diameter of less than $1\mu$. For example, the syn-1,2-polybutadiene short fibers are produced as follows: that is, syn-1,2-polybutadiene particles having a particle size of $10$–$700\mu$ are kneaded with unvulcanized rubber at a temperature below 190° C. and then the resulting mixture is extruded through a circular die having an inner diameter of 1–5 mm and a ratio of length to inner diameter of 1–20 at a temperature of at least 5° C. higher than the melting point of syn-1,2-polybutadiene. Next, the extruded product is cooled to room temperature and stretched by means of rolls at a roll temperature of 50°–100° C., whereby short fibers of oriented syn-1,2-polybutadiene can be obtained as a masterbatch wherein these fibers are dispersed in rubber. If it is intended to provide only the short fibers, the masterbatch may be treated with a solvent capable of dissolving only rubber, such as benzene or toulene. Moreover, a softener such as process oil, stearic acid, liquid rubber and the like, a reinforcer such as carbon black or a pigment may be added during the kneading.

Since the short fibers of syn-1,2-polybutadiene have a maximum diameter of not more than $10\mu$ and an average diameter of less than $1\mu$, they firmly adhere to rubber and have an effect of preventing the occurrence of rubber creeping. On the contrary, when the maximum diameter and average diameter of the short fibers are beyond the above defined values, the adhesion to rubber after the vulcanization becomes insufficient and hence large creep of rubber is caused. Consequently, premature wear and chipping are apt to be caused because a ground contact surface of the tire subjected to shearing stress in a given direction becomes irregular due to the large creep when microscopically examining the ground contact surface and hence the distribution of stress is non-uniform.

According to the present invention, the syn-1,2-polybutadiene short fibers are preferable to have a 1,2-structure unit content of not less than 80%. When the 1,2-structure unit content is less than 80%, the molecular regularity is low, so that the strength of the short fibers lowers and consequently the short fibers are cut at the stretching step. Thus, the short fibers having the 1,2-structure unit content of less than 80% can not develop a sufficient reinforcing effect.

Further, the syn-1,2-polybutadiene short fibers are preferable to have a melting point of not less than 190° C. When the melting point is less than 190° C., the temperature dependence of the short fibers becomes large and hence the vulcanizate compounded with such short fibers has a large temperature dependence. Moreover, the syn-1,2-polybutadiene short fibers are preferable to have a length of not more than 10 mm, because when the length is more than 10 mm, the workability of the resulting rubber composition is deteriorated too far.

According to the present invention, an amount of the syn-1,2-polybutadiene short fibers is 3–40 parts by weight, preferably 5–20 parts by weight based on 100 parts by weight of the rubber. When the amount of the short fibers is smaller than 3 parts by weight, the addition effect is less, while when the amount exceeds 40 parts by weight, the elasticity inherent to the rubber is lost.

In the rubber composition according to the present invention, carbon black having an iodine adsorption value (hereinafter abbreviated as IA) of not less than 76 mg/g is used in an amount of 30–100 parts by weight based on 100 parts by weight of the rubber. When the IA of carbon black is less than 76 mg/g, a satisfactory wear resistance can not be given to the vulcanizate. When the amount of carbon black is smaller than 30 parts by weight, the reinforcing effect and wear resistance are not satisfactorily obtained, while when the amount exceeds 100 parts by weight, the hardness of the vulcanizate becomes excessively large and the skidding performance is lower.

The p-phenylenediamine type antioxidant to be used in the present invention includes N-phenyl-N'-isopropyl-p-phenylenediamine, N,N'-diphenyl-p-phenylenediamine, N-phenyl-N'-(2,4-dimethyl)butyl-p-phenylenediamine, N,N'-di-2-naphthyl-p-phenylenediamine and mixtures thereof. Such an antioxidant is used in an amount of 0.5–5 parts by weight based on 100 parts by weight of the rubber. When the amount of the antioxidant is smaller than 0.5 part by weight, the addition effect is less, while when the amount exceeds 5 parts by weight, the tear strength of the vulcanizate becomes low and consequently the chipping phenomenon is apt to occur.

As mentioned above, the novel rubber composition to be disposed in the tread portion of the pneumatic tire according to the present invention is prepared by compounding the defined amount of the syn-1,2-polybutadiene short fibers together with the defined amounts of the specified carbon black and p-phenylenediamine type antioxidant into the rubber. Particularly, the adhesion of the syn-1,2-polybutadiene short fibers to the rubber after the vulcanization is very firm, so that there is largely improved the drawback of the conventional short fiber reinforced vulcanizate causing a large creep. Further, when the rubber composition according to the present invention is used in the tread portion, the wear resistance and particularly chipping resistant property are improved considerably and also the groove cracking is prevented by the addition of the p-phenylenediamine type antioxidant.

Moreover, the pneumatic tire of the present invention includes bias type tires, belted bias type tires and radial type tires. In these tires, there may be used cords composed of natural or synthetic organic fiber, glass cords, metallic cords and the like.

The present invention will be described in greater detail with reference to the following examples and comparative examples.

Examples 1–3 and Comparative Examples 1–2

Various rubber compositions having a compounding recipe as shown in the following Table 1 were prepared and a tear strength thereof after the vulcanization was measured according to a tear resistance test JIS K6301. Next, a pneumatic radial type tire for bus and truck having a tire size of 1000R 20 was manufactured by using the above rubber composition in the tread portion of the tire and run on a bad road over a distance of 20,000 km. Thereafter, the presence or absence of the chipping phenomenon was observed. Further, the wear loss of tire weight was measured by subtracting the tire weight after running from the tire weight before running and indicated in Table 1 as a wear resistance index expressed by the following equation:

$$\text{Wear resistance index} = \frac{\text{Wear loss in the tire of Example 1}}{\text{Wear loss in each tire other than the tire of Example 1}} \times 100$$

The average diameter of the syn-1,2-polybutadiene short fibers was measured as follows: that is, a mixture consisting of the rubber and syn-1,2-polybutadiene short fibers obtained by extending a blend of the rubber and syn-1,2-polybutadiene particles through a circular die with a diameter of 2 mm and a length of 10 mm was imbued in n-hexane for 48 hours to dissolve the rubber. Thus obtained short fibers were dried at a freezing temperature and dyed with osmium oxide. Then, they were embedded into polymethylmethacrylate and cut in a direction perpendicular to the extrusion direction to form a very thin slice. The diameters of short fibers contained in the slice were measured by an electron microscope and then the average diameter was calculated according to the following equation:

$$\bar{r} = \frac{\Sigma n_i \cdot r_i}{\Sigma n_i}$$

wherein $\bar{r}$ is an average diameter, $r_i$ is a diameter of short fiber, $n_i$ is a number of short fibers having a diameter of $r_i$ and $\Sigma n_i$ is 300.

TABLE 1(a)

| Compounding recipe (parts by weight) | Example 1 | Example 2 | Example 3 | Comparative example 1 | Comparative example 2 |
|---|---|---|---|---|---|
| Natural rubber | 70 | 70 | 70 | 70 | 70 |
| Polyisoprene rubber | 10 | 10 | 10 | 10 | 10 |
| Polybutadiene rubber | 20 | 20 | 20 | 20 | 20 |
| Carbon black N-220 (IA: 121 mg/g) | 50 | 50 | 50 | 50 | 50 |
| Aromatic oil | 10 | 10 | 10 | 10 | 10 |
| 810 NA *1 | 1.5 | 1.5 | 1.5 | 1.5 | 1.5 |
| Stearic acid | 2 | 2 | 2 | 2 | 2 |
| Zinc white | 3 | 3 | 3 | 3 | 3 |
| Nobs *2 | 0.7 | 0.7 | 0.7 | 0.7 | 0.7 |
| DM *3 | 0.3 | 0.3 | 0.3 | 0.3 | 0.3 |
| Sulfur | 2.2 | 2.2 | 2.2 | 2.2 | 2.2 |
| Syn-1,2-polybutadiene | 10 | | | | |

TABLE 1(a)-continued

| Compounding recipe (parts by weight) | Example 1 | Example 2 | Example 3 | Comparative example 1 | Comparative example 2 |
| --- | --- | --- | --- | --- | --- |
| short fiber No. 1 | | | | | |
| Syn-1,2-polybutadiene short fiber No. 2 | | 10 | | | |
| Syn-1,2-polybutadiene short fiber No. 3 | | | 10 | | |

Note
*1: N-phenyl-N'-isopropyl-p-phenylenediamine
*2: N-oxydiethylene-2-benzothiazylsulfenamide
*3: dibenzothiazylsulfide

TABLE 1(b)

| Compounding recipe (parts by weight) | Example 1 | Example 2 | Example 3 | Comparative example 1 | Comparative example 2 |
| --- | --- | --- | --- | --- | --- |
| Syn-1,2-polybutadiene short fiber No. 4 | | | | 10 | |
| Syn-1,2-polybutadiene short fiber No. 5 | | | | | 10 |
| Average diameter of short fiber $\mu$ | 0.2 | 0.5 | 0.8 | 1.5 | 10.0 |
| Maximum diameter of short fiber $\mu$ | 2.9 | 7.0 | 7.5 | 12 | 59 |
| Results | | | | | |
| Tear strength kg/cm | 96 | 94 | 94 | 72 | 68 |
| Chipping phenomenon | absence | absence | absence | slight presence | presence |
| Wear resistance index | 100 | 101 | 98 | 85 | 87 |

As apparent from the data of Table 1, in the pneumatic tires according to the present invention, the chipping phenomenon is completely prevented and at the same time the wear resistance is largely improved.

Examples 4-7 and Comparative examples 3-4

Various rubber compositions having a compounding recipe as shown in the following Table 2 were examined in the same manner as described in Example 1 to obtain results as shown in Table 2.

and a flex resistance thereof after the vulcanization was estimated by a flexing number up to occurrence of crack using a de Mattia machine (300 cycles/minute) and indicated as a flex resistance index according to the following equation:

$$\text{Flex resistance index} = \frac{\text{Flexing number of each example}}{\text{Flexing number of Example 8}} \times 100$$

Next, a pneumatic radial type tire for bus and truck

TABLE 2

| Compounding recipe (parts by weight) | Comparative example 3 | Example 4 | Example 5 | Example 6 | Example 7 | Comparative example 4 |
| --- | --- | --- | --- | --- | --- | --- |
| Natural rubber | 70 | 70 | 70 | 70 | 70 | 70 |
| Polybutadiene rubber | 30 | 30 | 30 | 30 | 30 | 30 |
| Carbon black N-220 | 50 | 50 | 50 | 50 | 50 | 50 |
| Aromatic oil | 10 | 10 | 10 | 10 | 10 | 10 |
| 810 NA | 1 | 1 | 1 | 1 | 1 | 1 |
| Stearic acid | 2 | 2 | 2 | 2 | 2 | 2 |
| Zinc white | 3 | 3 | 3 | 3 | 3 | 3 |
| Nobs | 0.8 | 0.8 | 0.8 | 0.8 | 0.8 | 0.8 |
| DM | 0.4 | 0.4 | 0.4 | 0.4 | 0.4 | 0.4 |
| Sulfur | 2.2 | 2.2 | 2.2 | 2.2 | 2.2 | 2.2 |
| Syn-1,2-polybutadiene short fiber No. 1 | 1 | 3 | 5 | 20 | 40 | 50 |
| Results | | | | | | |
| Tear strength kg/cm | 72 | 89 | 92 | 94 | 91 | 73 |
| Chipping phenomenon | presence | absence | absence | absence | absence | presence, cut separation occurred |
| Wear resistance index | 68 | 113 | 102 | 92 | 90 | 75 |

As apparent from the data of Table 2, the pneumatic tire aimed at the present invention is first obtained by using the rubber composition containing 3-40 parts by weight, preferably 5-20 parts by weight of syn-1,2-polybutadiene short fibers based on 100 parts by weight of rubber in the tread portion.

Examples 8-10 and Comparative examples 5-8

Various rubber composition having a compounding recipe as shown in the following Table 3 were prepared having a tire size of 1000 R 20 was manufactured by using the above rubber composition in the tread portion of the tire. The absence or presence of chipping phenomenon was observed with respect to each tire in the same manner as described in Example 1. Further, the absence or presence of groove cracking was observed after the tire was run on a bad road over a distance of 50,000 km.

TABLE 3(a)

| Compounding recipe (parts by weight) | Example 8 | Example 9 | Example 10 | Comparative example 5 | Comparative example 6 | Comparative example 7 | Comparative example 8 |
|---|---|---|---|---|---|---|---|
| Natural rubber | 100 | 100 | 100 | 100 | 100 | 100 | 100 |
| Carbon black N-220 | 50 | 50 | 50 | 50 | 50 | 50 | 50 |
| Aromatic oil | 10 | 10 | 10 | 10 | 10 | 10 | 10 |
| Stearic acid | 2 | 2 | 2 | 2 | 2 | 2 | 2 |
| 810 NA | 1 | | | | | | |
| DP *1 | | 1 | | | | | |
| Santoflex 13 *2 | | | 1 | | | | |
| RD *3 | | | | 1 | | | |
| NS-6 *4 | | | | | 1 | | |
| SP *5 | | | | | | 1 | |
| MB *6 | | | | | | | 1 |
| Zinc white | 3.5 | 3.5 | 3.5 | 3.5 | 3.5 | 3.5 | 3.5 |
| Nobs | 0.5 | 0.5 | 0.5 | 0.5 | 0.5 | 0.5 | 0.5 |
| Sulfur | 2.1 | 2.1 | 2.1 | 2.1 | 2.1 | 2.1 | 2.1 |
| Syn-1,2-polybutadiene short fiber No. 1 | 10 | 10 | 10 | 10 | 10 | 10 | 10 |

Note
*1: N,N'-diphenyl-p-phenylenediamine
*2: N-1,3-dimethyl-butyl-N'-phenyl-p-phenylenediamine
*3: polymerized trimethyldihydroquinoline
*4: 2,2'-methyl-bis(4-methyl-6-tert-butylphenol)
*5: styrenated phenol
*6: 2-mercaptobenzimidazole TABLE 3(b)

| Results | Example 8 | Example 9 | Example 10 | Comparative example 5 | Comparative example 6 | Comparative example 7 | Comparative example 8 |
|---|---|---|---|---|---|---|---|
| Flex resistance index | 100 | 101 | 105 | 76 | 52 | 74 | 40 |
| Chipping phenomenon | absence | absence | absence | absence | absence | absence | absence |
| Groove cracking | absence | absence | absence | presence | presence | slight presence | presence |

As apparent from the data of Table 3, when the p-phenylenediamine type antioxidant is compounded into the rubber composition according to the present invention, there is caused no groove cracking.

From the above examples, it can be seen that the pneumatic tires according to the present invention have an excellent wear resistance and prevent the occurrence of groove cracking, and particularly the chipping resistant property is considerably improved.

What is claimed is:

1. A pneumatic tire having an improved chipping resistant property, comprising a tread portion formed from a vulcanizate of a rubber composition comprising; (a) 3-40 parts by weight of preformed short fibers of syndiotactic-1,2-polybutadiene having a maximum diameter of not more than $10\mu$ and an average diameter of less than $1\mu$, (b) 30-100 parts by weight of carbon black having an iodine adsorption value of not less than 76 mg/g and (c) 0.2-5 parts by weight of a p-phenylenediamine type antioxidant, on a basis of 100 parts by weight of (d) a rubber selected from natural rubbers, synthetic rubbers and blends thereof in an optional blending ratio.

2. A pneumatic tire as claimed in claim 1, wherein each of said short fibers of syndiotactic-1,2-polybutadiene has a 1,2-structure unit content of not less than 80%.

3. A pneumatic tire as claimed in claim 1, wherein each of said short fibers of syndiotactic-1,2-polybutadiene has a melting point of not less than 190° C.

4. A pneumatic tire as claimed in claim 1, wherein the amount of said short fibers of syndiotactic-1,2-polybutadiene is 5-20 parts by weight.

5. A pneumatic tire as claimed in claim 1, wherein said p-phenylenediamine type antioxidant is selected from the group consisting of N-phenyl-N'-isopropyl-p-phenylenediamine, N,N'-diphenyl-p-phenylenediamine, N-phenyl-N'-(2,4-dimethyl)butyl-p-phenylenediamine, N,N'-di-2-naphthyl-p-phenylenediamine and mixtures thereof.

* * * * *